United States Patent [19]

Vockel, Jr. et al.

[11] Patent Number: 5,223,330

[45] Date of Patent: Jun. 29, 1993

[54] PHOSPHORESCENT FIBER REINFORCED PLASTIC ARTICLE AND PROCESS FOR MAKING THE SAME

[75] Inventors: Richard L. Vockel, Jr., Oak Ridge, N.C.; Robert E. Myers, Nassau Bay, Tex.; Ladson L. Fraser, Greensboro, N.C.

[73] Assignee: Precision Fabrics Group, Inc., Greensboro, N.C.

[21] Appl. No.: 884,641

[22] Filed: May 12, 1992

Related U.S. Application Data

[62] Division of Ser. No. 618,966, Nov. 28, 1990, Pat. No. 5,135,591.

[51] Int. Cl.[5] .................. B32B 5/16; B32B 27/20; B32B 33/00
[52] U.S. Cl. .................. 428/204; 428/237; 428/246; 428/283; 428/285; 428/286; 428/287; 428/609; 428/914
[58] Field of Search ............ 428/204, 237, 246, 283, 428/285, 286, 287, 690, 913

[56] References Cited

U.S. PATENT DOCUMENTS

| | | | |
|---|---|---|---|
| 3,291,668 | 12/1966 | Goldstein | 156/67 |
| 4,211,813 | 7/1980 | Gravisse et al. | 428/263 |
| 4,663,214 | 5/1987 | Coburn, Jr. | 428/204 |
| 4,781,647 | 11/1988 | Doane, Jr. | 428/690 |

*Primary Examiner*—James C. Cannon
*Attorney, Agent, or Firm*—Finnegan, Henderson, Farabow, Garrett & Dunner

[57] ABSTRACT

A phosphorescent fiber reinforced plastic article comprising a fabric carrying a phosphorescent material encapsulated on a surface of a cured fiber reinforced plastic material made by a variety of processes including, but not limited to, pultrusion, compression molding, filament winding, contact molding, resin transfer molding, a continuous panel process, or structural reaction injection molding.

2 Claims, No Drawings

PHOSPHORESCENT FIBER REINFORCED PLASTIC ARTICLE AND PROCESS FOR MAKING THE SAME

This is a division of U.S. patent application Ser. No. 07/618,966, filed Nov. 28, 1990, now U.S. Pat. No. 5,135,591.

BACKGROUND OF THE INVENTION

1. Field of the Invention

This invention relates to a phosphorescent fiber reinforced plastic (FRP) article and to a process for making such an article.

2. Description of the Related Art

Phosphorescent coated textiles and fabrics are known, as exemplified by U.S. Pat. No. 3,291,668 to Goldstein which teaches phosphorescent particles on a textile substrate and then pressure laminating a clear plastic outer layer. The purpose of the invention is to provide an improved phosphorescent coated textile material, particularly for the foot covering art.

U.S. Pat. No. 4,663,214 to Coburn teaches an improved phosphorescent material decorative in visible light, and a process for making the same. The phosphorescent material comprises a support layer of opaque material, an intermediate layer of phosphorescent material in combination with an over layer of substantially iridescent material, and a top surface layer of protective material.

U.S Pat. No. 4,211,813 to Gravisse et al. teaches a photoluminescent flexible sheet material having an enhanced permeability to water vapor. The photoluminescent flexible sheet comprises a flexible substrate having at least one coating film comprising at least one synthetic resin having dispersed therethrough a photoluminescent complex, said complex comprising at least one phosphorescent metal sulphide and an organic substance which absorbs radiant energy and emits it in a wavelength lying within the phosphorescent metal sulfide. The purpose of the invention is to provide safety and protective garments.

U.S. Pat. No. 4,781,647 to Doave teaches extruding a thermoplastic polymer containing a mixture of phosphorescent particles. The resultant fibers are then used to make doll hair which glows in the dark after being submitted to a source of energy.

None of these patents teaches applying a phosphorescent material to a surface veil, fabric or mat and then using the resultant product to provide a phosphorescent material on the surface of a molded article formed from a fiber reinforced plastic material Incorporating phosphorescent material technology into the fiber reinforced plastic material manufacturing processes is not taught by the prior art.

The term fiber reinforced plastic (FRP) defines a material obtained by a series of processes in which fibrous materials (glass, aramid, graphite, etc.) are combined with resinous materials, such as thermosetting or thermoplastic resins, to make a shape that is stronger than the resin itself. Thermosetting resins encompass a wide range of materials including, but not limited to, polyesters, vinyl esters, bisphenol, epoxies, etc. A thermosetting resin is one which cures or polymerizes and cannot be melted and reshaped with the application of heat.

In fabricating a thermoset FRP part, typically the fiber reinforcement is saturated or wet-out with a liquid thermosetting resin. After being wet-out, the saturated reinforcement is then shaped either manually or mechanically into the form of the finished article such as a part. Once formed, the shape is then allowed to cure via the polymerization of the thermosetting resin. This is accomplished by a specific time and temperature relationship based on the formulation of the resin.

Pultrusion is a thermoset FRP process wherein reinforcements and surfacing fabrics such as mats or veils are drawn through a resin bath to achieve wet-out. Then they are pulled through a mold in the shape of the desired article. Typically, the mold is heated to accelerate the polymerization.

Contact molding or open molding is another FRP process. Resins and reinforcements are manually (hand lay-up) or mechanically (spray-up) deposited on an open mold surface. The mold surface is preferably previously coated with a gel coat and is provided with a surfacing fabric such as a mat or veil. Once the required amounts of reinforcements and resin have been deposited on the mold, the laminate is worked with rollers, brushes or squeegees, usually manually, to remove any trapped air and thoroughly saturate or wet-out the reinforcements with resin. Once this is completed, the laminate is allowed to cure, normally at ambient temperature.

Resin transfer molding (RTM) and structural reaction injection molding (S-RIM) are two similar closed mold FRP processes in which the required reinforcement package, including a surfacing fabric such as a mat or veil, is placed in one-half of the mold cavity, usually the bottom half. Once properly positioned, the top half of the mold is closed on the bottom half thereof and secured in place. Next, the resin is injected slowly under minimal (e.g 50 psi) pressure in RTM or rapidly under high pressure (e.g. 2000 psi) in S-RIM. The mechanical pumping and resulting pressure causes the air to be flushed out of the mold cavity and the resin to saturate or wet-out the reinforcement. The resin impregnated reinforced article is then allowed to cure.

Compression molding is also a FRP mold process. In this process, the reinforcement package including surfacing fabric (mats or veil) and the resin are placed on one-half, usually the bottom half, of the mold cavity. Once properly positioned, the top half of the mold is mechanically closed on the bottom half using a press which compresses the reinforcement package and resin under pressure (from 50 to 1500 psi) to flush out the air and thoroughly saturate or wet-out the reinforcement package with resin. It is then cured normally with the assistance of heat.

Filament winding is a FRP process in which reinforcements, normally continuous rovings, are saturated with resin, normally by pulling them through a pan or bath containing the resin. The reinforcements are then wound on a rotating mandrel in a specific pattern. The mandrel may or may not have been previously covered with a resin impregnated surfacing fabric. An outer layer or outer layers of surfacing fabric may be wrapped over the resin impregnated reinforcement when required. Once the required amount of resin, reinforcements and surfacing fabrics are properly placed on the mandrel, the laminate is allowed to cure with or without the assistance of heat.

Continuous panel process is a FRP process for making continuous flat and/or shaped, e.g. corrugated, panels. It involves depositing a resin on a carrier film which then passes under a reinforcement deposition area. Various types of reinforcement are then applied to the film of resin. The reinforcement and resin then go through a compaction section where a series of belts, screens, or rollers force air out and thoroughly saturate or wet-out the reinforcement with resin. A surfacing fabric such as mat or veil is then placed on the surface of the resulting saturated material and the fabric is allowed to saturate with resin. A carrier film is then applied to the top surface of the resulting article which is passed through a curing station where the resin cures normally with the assistance of heat. Once cured, the carrier film is removed and the article is cut to the desired length.

Previous attempts to add a phosphorescent material directly to a resin system have been unsuccessful, mainly due to the settling away of the phosphorescent material from the surface of the final article. This was due to the fact that phosphorescent materials have a relatively high density or specific gravity of e.g. 3.85-4.50, whereas the resin mix generally has a relatively low density or specific gravity of, e.g., 1.15-1.40. When put in the resin mix, the phosphorescent materials tend to sink to the bottom of the resin tank and/or wet-out pan. Little or less of the phosphorescent materials, therefore, become attached to the reinforcements or, more particularly, remain on the surface of the molded profile. Since the resin mixture is usually opaque due to the incorporation of fillers, any phosphorescent materials not on the surface would tend to be shielded from exhibiting their afterglow properties.

Putting the phosphorescent materials directly into the resin mix has not solved the problem due to the overall opacity of the system. The resin mixtures usually contain ten to forty percent by weight of a filler. This causes the mix to be relatively opaque and prevents the phosphorescent materials from being charged by incoming light which, in turn, prevents the glow from being visible.

SUMMARY OF THE INVENTION

The present invention relates to a process for making a phosphorescent fiber reinforced plastic article comprising: (a) applying a phosphorescent material to a fabric; (b) combining fiber reinforced plastic material whereby a portion of the resin in the fiber reinforced plastic material forms a coating on said fabric; and (c) curing the resulting article.

The present invention also relates to a phosphorescent fiber reinforced plastic article comprising a fabric carrying a phosphorescent material encapsulated on a surface of a cured fiber reinforced plastic material.

The present invention overcomes the problems and disadvantages of the prior art by producing a fiber reinforced plastic article with a phosphorescent material on the surface thereof. This is accomplished by applying a phosphorescent material to a fabric and then combining fiber reinforced plastic material with said fabric.

The present invention provides a fiber reinforced plastic article which glows in the dark because the phosphorescent treated fabric remains on the surface of the article, e.g. molded part. The phosphorescent fabric is encapsulated on a surface of the fiber reinforced plastic material since a portion of the resin in the material forms a coating on the fabric.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

DESCRIPTION OF THE PREFERRED EMBODIMENTS

The fabric is printed, coated, or treated with phosphorescent materials. The phosphorescent materials can be applied in the form of a paste, liquid dispersion, powder, or foam to the fabric.

Methods in which a phosphorescent material paste may be applied to the fabric are exemplified by, but not limited to, the following: (a) dipping then nipping, (b) screen printing (c) gravure roll printing, (d) froth or stabilized foam finishing application, (e) knife over roll, (f) knife over pad (g) knife over table, (h) conventional printing systems for textiles, (i) paint spraying unit, and (j) kiss roll applicator/doctor blade. All of these methods are followed by curing the carrier resin and drying.

Phosphorescent materials which can be applied to the fabric include, but are not limited to: zinc sulphide, calcium sulphide, strontium sulphide, cadmium sulphide, barium sulphide, magnesium sulphide aniline dyes and other coloring pigments or mixtures thereof. These materials possess a "glow in the dark" property when exposed to an energy source.

A fabric for use as the surfacing fabric is any nonwoven, woven or mat fabric which can be coated, finished and/or printed with phosphorescent materials. These include, but are not limited to, Nexus (a spunlaced polyester fabric), Reemay (a spunbonded polyester fabric), Cerex (a spunbonded nylon), and various glass fabrics.

Nexus is a spunlaced polyester nonwoven fabric manufactured by Precision Fabrics Group, Inc. One of its many uses is in the FRP industry where it is placed on the surface of a FRP article or part during the manufacture of the article. It provides improved appearance, corrosion resistance, weatherability and abrasion resistance by providing a resin rich protective surface to that article.

After the phosphorescent fabric is produced, it is applied to a fiber reinforcement resin by pultrusion, compression molding, filament winding, contact molding, resin transfer molding, structural reaction injection molding or similar technique. The result is a FRP article which glows in the dark because the phosphorescent treated fabric, e.g. mat or veil, is on the surface of the molded article, and is encapsulated in a thin resin layer.

These and other features and advantages of the present invention will be made more apparent from the following examples.

EXAMPLE 1

A phosphorescent fabric was prepared as follows:

A phosphorescent coating paste was prepared with the components in Table I.

TABLE I

| | SOLIDS | BEFORE CURING | AFTER CURING |
|---|---|---|---|
| ROHM AND HAAS CARRIER TR 407 ACRYLIC LATEX | 45.5% | 300 pts. | 136.5 pts. |
| USR OPTONIX, INC. - PIGMENT #2330 - PHOSPHORESCENT | 100.0% | 104 pts. | 104 pts. |
| ROHM AND HAAS THICKENER ASE60 | 28.0% | 5 pts. | 1.4 pts. |

TABLE I-continued

| | SOLIDS | BEFORE CURING | AFTER CURING |
|---|---|---|---|
| WATER | — | 5 pts. | 0 pts. |
| ROHM AND HAAS ACRYSOL RM-5 ASSOCIATIVE THICKENER | 30.0% | 5 pts. | 1.5 pts. |
| AMMONIA - AQUEOUS 26% | — | 3 pts. | 0 pts. |

The above formulation of carrier resin, phosphorescent pigment, thickeners, water and ammonia was blended together to produce a phosphorescent coating paste with a viscosity of 22750cps (LVT. Spindle 6;20 RPMS) with a pH of 9.6. Although the carrier resin in this Example is acrylic latex, it could also be selected from the group comprising any epoxy, polyvinylchloride, ethylenevinylchloride, polyurethane, polyvinylacetate, acrylonitrile rubber, melamine and co-polymers of these compounds.

The phosphorescent paste was applied to a 1.3 ounce per square yard spunlaced (hydroentangled) polyester non-woven fabric (Sontara 8010—DuPont) by knife over pad coating the paste to the surface of the fabric.

The paste was applied to the fabric at a temperature of 80° F. by scrape coating with a beveled edge knife over a foam rubber pad to form a solid, uniform coating of 3.3 ounces per square yard. The coated fabric was dried and cured in a forced air Mathis lab oven at a temperature of 375° F. for thirty (30) seconds. The coated fabric displayed the following properties:

TABLE II

| PROPERTY | TEST METHOD | VALUES |
|---|---|---|
| BASIS WEIGHT | ASTM D1117 517 | 4.3 oz./sq. yd. |
| COLOR | N/A | Yellow-Green (on one side) |
| TENSILE STRENGTH | ASTM D1117 517 | MD - 38.3<br>XD - 22.2 |
| PHOSPHORESCENCE | Exposed to fluorescent cool white shade light box for 15-minute duration; exposed to dark environment where luminescence is rated in a subjective manner. | Bright Phosphorescence (a light yellow-green at least for 30 minutes) |

The phosphorescent fabric is suitable for application to a fiber reinforced plastic by means of pultrusion, compression molding, filament winding, contact molding, resin transfer molding, structural reaction injection molding, a continuous panel process or other similar process.

EXAMPLE 2

A phosphorescent fabric was prepared by screen printing a sample of Nexus fabric with a phosphorescent material in the shape of a pattern, e.g. small hearts. The phosphorescent fabric was then incorporated into a grating bar and pultruded. The resultant bar "glowed in the dark" because the phosphorescent materials were on the fabric and the fabric was physically positioned on the surface of the bar and encapsulated by a micro thin layer of resin.

The pultruded bars exhibited the same unique phosphorescent properties of the printed fabric, indicating success in achieving phosphorescence in thermoset pultruded FRP parts.

Screen printing provides flexibility in determining the pattern and amount of surface that will be covered with the phosphorescent materials.

EXAMPLE 3

A phosphorescent fabric was prepared by printing with 100% coverage of a phosphorescent coating. The phosphorescent fabric was then slit into sample widths for experimental trials. Samples of pultruded grating bars were then run utilizing the phosphorescent coated fabric and a thermosetting resin. The pultruded bars exhibited the same unique phosphorescent properties of the coated fabric, indicating success in achieving a phosphorescent thermosetting pultruded FRP article.

EXAMPLE 4

A phosphorescent fabric was prepared by the same method as in Example 3. The phosphorescent fabric was combined to the fiber reinforced plastic with an existing layer of fabric, which did not contain phosphorescent materials. Essentially, the part had two layers of fabric instead of one. The lower layer, next to the resin, was free of phosphorescent materials while the upper layer was coated with the phosphorescent materials.

What is claimed is:

1. A composite article comprising a combined resin-containing fiber reinforced plastic and a fabric substrate having a phosphorescent material distributed thereon wherein a portion of the resin from the fiber-reinforced plastic forms a coating over the phosphorescent material and the fabric.

2. The article of claim 1, which also comprises a fabric free of phosphorescent material.

* * * * *